United States Patent [19]
Ecktman

[11] Patent Number: 4,784,376
[45] Date of Patent: Nov. 15, 1988

[54] END CAP ASSEMBLY FOR AIR SPRING

[75] Inventor: Jack D. Ecktman, Indianapolis, Ind.

[73] Assignee: The Firestone Tire & Rubber Company, Akron, Ohio

[21] Appl. No.: 62,987

[22] Filed: Jun. 17, 1987

[51] Int. Cl.⁴ .............................................. F16F 9/54
[52] U.S. Cl. ................................................ 267/64.27
[58] Field of Search ............. 267/64.11, 64.21, 64.23, 267/64.24, 64.27, 118, 153; 280/711, 712

[56] References Cited

U.S. PATENT DOCUMENTS

| | | | |
|---|---|---|---|
| 2,874,458 | 2/1959 | Smith | 29/436 |
| 2,920,885 | 1/1960 | Niclas | 267/64.27 |
| 2,977,134 | 3/1961 | Helling | 280/124 |
| 2,999,681 | 9/1961 | Muller et al. | 267/64.27 |
| 3,038,717 | 6/1962 | Bank . | |
| 3,788,628 | 1/1974 | Hotz, Jr. . | |
| 3,790,147 | 2/1974 | Owen . | |
| 4,325,541 | 4/1982 | Korosladanyi . | |
| 4,378,935 | 4/1983 | Brown et al. | 267/64.27 |
| 4,506,910 | 3/1985 | Bierens | 280/711 |
| 4,564,177 | 1/1986 | Leonard | 267/64.24 |

FOREIGN PATENT DOCUMENTS

| | | | |
|---|---|---|---|
| 0015705 | 7/1969 | Japan | 267/64.27 |
| 907555 | 10/1962 | United Kingdom . | |

Primary Examiner—Duane A. Reger
Attorney, Agent, or Firm—Ronald Brietkrenz

[57] ABSTRACT

An air spring having a pair of spaced end members and an intervening tubular elastomeric sleeve with internal reinforcing cords forms a fluid pressure chamber for mounting between spaced portions of a vehicle to provide damping and to absorb road shock. Each of the end members has an end cap and a clamp ring provided with annular mating surfaces. The clamp ring is formed with an annular convex projection which extends into a larger annular concave recess formed in the end cap. When the ring and end cap are snapped axially together, two annular radially space areas of the sleeve are placed in compressive shear to provide a secure clamping engagement with the sleeve material. An annular expansion area is formed within the recess between the projection permitting the sleeve material located between the compressive shear areas to expand therein. The sleeve cords move through a direction change of approximately 180°. The annular projection and annular recess form two radially spaced annular pinch areas on each of the end members, and the intervening expansion area ensures a change of direction of the reinforcement cord to securely clamp the sleeve ends therebetween eliminating any internal bead reinforcement on the sleeve. In a second embodiment helical thread-like mating projections formed on the end cap and clamp ring provide the two compressive shear pinch areas and intervening expansion area.

11 Claims, 2 Drawing Sheets

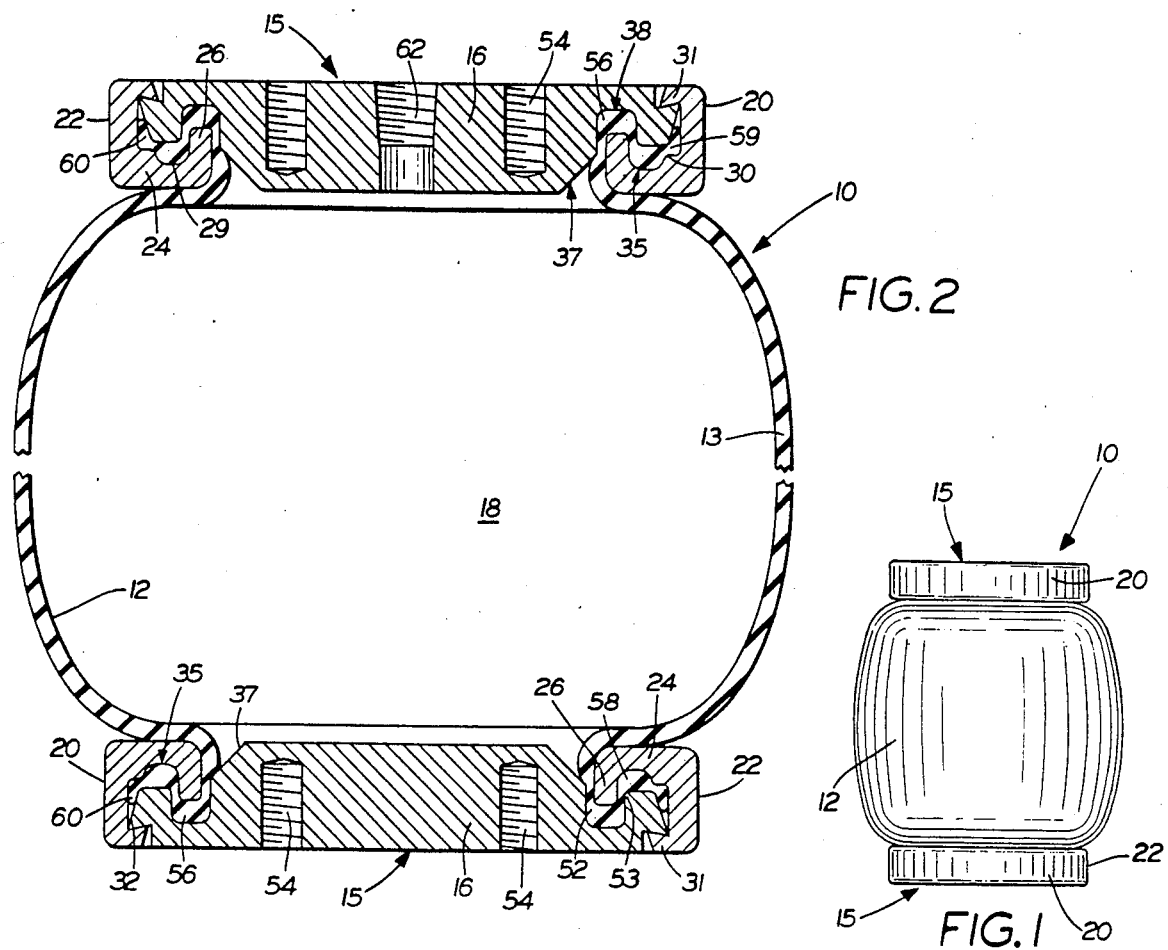
FIG. 2
FIG. 1
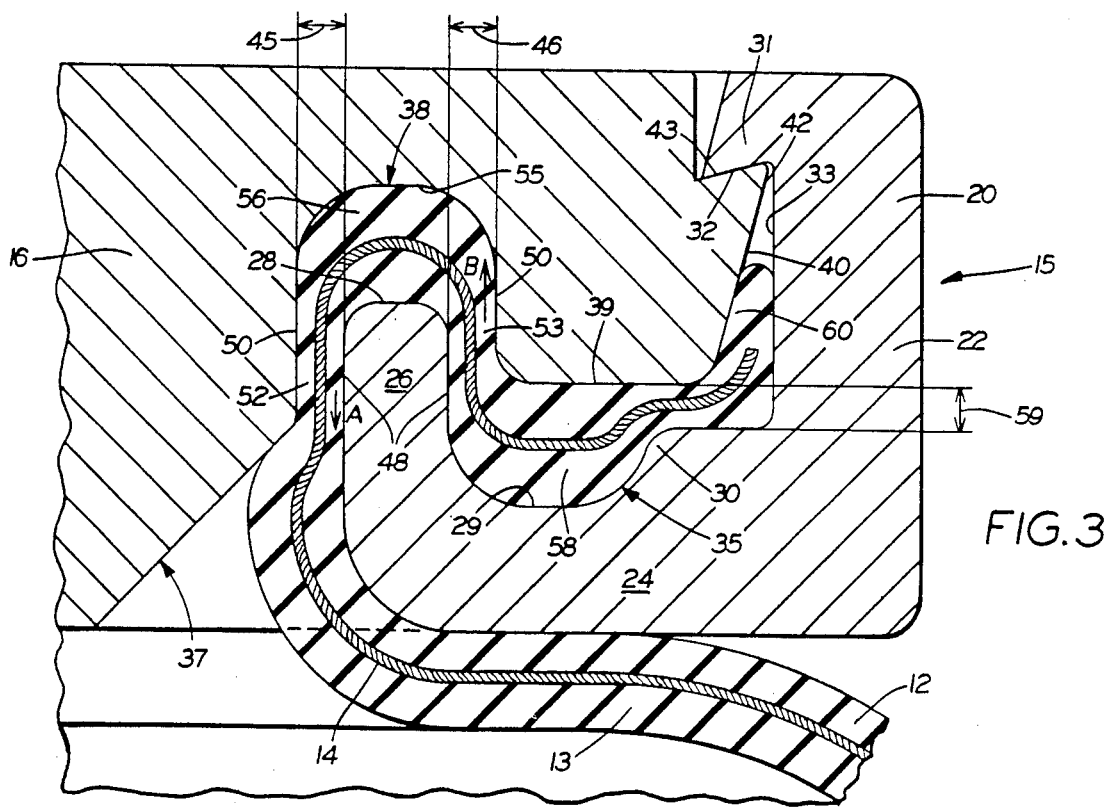
FIG. 3

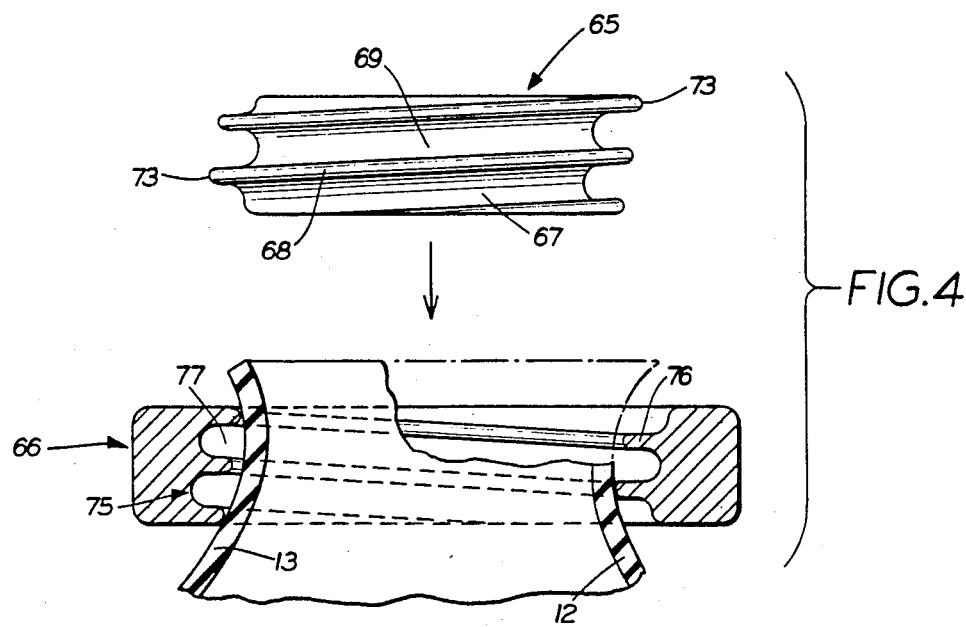
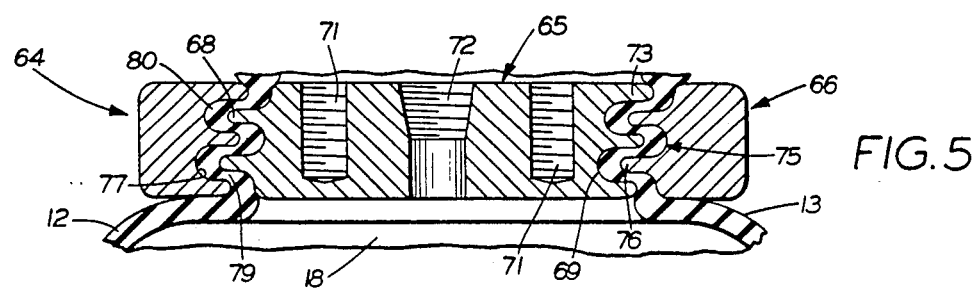
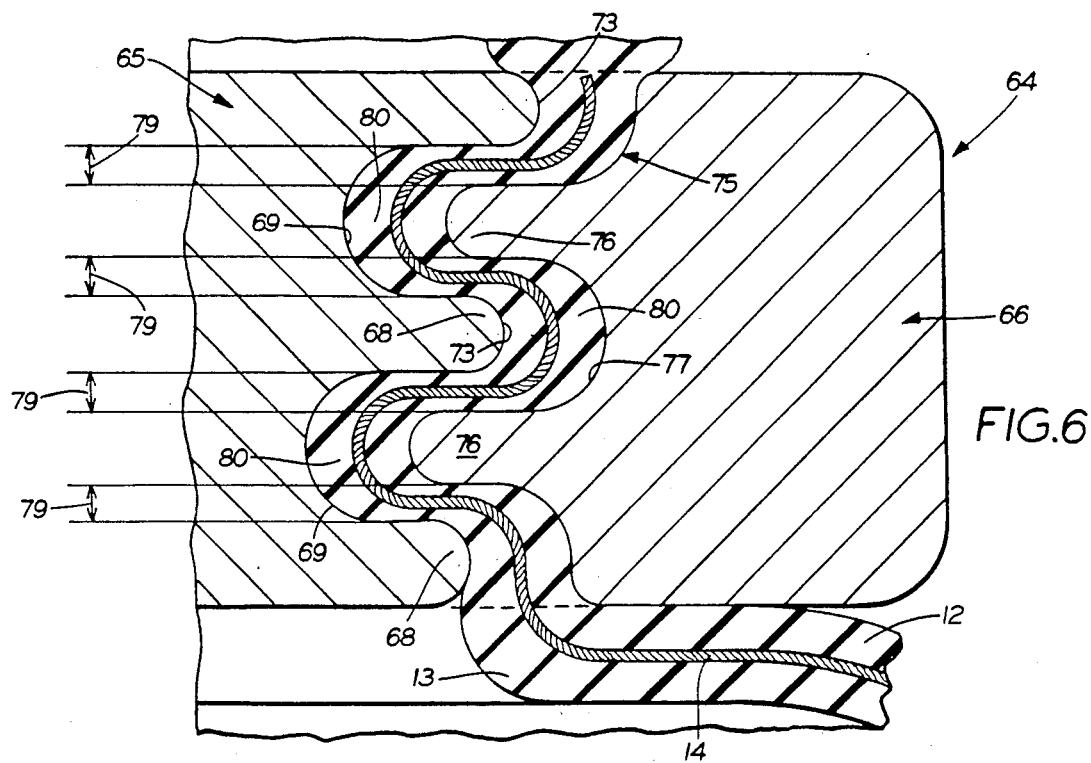

END CAP ASSEMBLY FOR AIR SPRING

TECHNICAL FIELD

The invention herein resides in the art of air springs. More particularly, the invention relates to an air spring formed from a tubular elastomeric sleeve wherein sealing beads are mechanically formed at the ends thereof eliminating the heretofore required separate reinforcing beads mounted within the ends of the tubular sleeve.

BACKGROUND ART

Air springs are well known in the art and comprise an elastomeric sleeve which is maintained between a pair of end members adapted primarily for implementation in motor vehicles for supporting the vehicle body. The air springs are sealed at the ends by the end members to form a pressurized fluid chamber within the sleeve. Reinforcing beads previously have been molded about or within the peripheries of the sleeve ends to provide for a fluid tight seal with the end members. It has also been known to seal the ends of the sleeve forming the air spring by means of complex mechanical structures, typically incorporating metallic plates and the like secured by means of bolts or other fastening means. These sealing structures are both time consuming and expensive in implementation.

Previously known structures of the general nature set forth herein are shown in U.S. Pat. Nos. 2,874,458; 2,977,134; 3,038,717; 3,790,147; 4,325,541; 4,506,910; and British Pat. No. 907,555. None of these references, however, teaches an air spring which may be quickly and effectively formed from a tubular elastomeric sleeve without a separate reinforcing bead and wherein the bead is formed and sealed by simple engagement of snap-fitting together parts of metal and/or plastic. The teachings of the prior art have been expensive as to both time and material involved and, due to the metallic parts and separate bead rings previously used, have been a source of undesired weight in a vehicle.

Furthermore, in existing air springs as the internal pressure increases the separation forces acting on the sleeve end seals increases thereby limiting the amount of internal pressure which can be utilized for the air spring.

Accordingly, there is desire in the art for a simplistic and inexpensive air spring which is formed from a tubular elastomeric sleeve, the ends of which are sealed by mating parts which seal the unit and form a pressurized fluid chamber without requiring the installation of separate reinforcing beads within the sleeve ends during formation of the tubular sleeve.

DISCLOSURE OF THE INVENTION

In light of the foregoing, it is a first aspect of the invention to provide an air spring without separate mechanical reinforcing beads molded within the ends of the sleeve.

Another aspect of the invention is the formation of an air spring wherein the beads are formed from the elastomeric material of the sleeve ends by the clamping engagement of mating members.

Still a further aspect of the invention is to provide an air spring wherein compressive forces on the air spring and the force exerted by the trapped fluid tighten the clamping action of the end mating members against the formed beads.

An additional aspect of the invention is the formation of an air spring in which the mating end members may be molded of plastic or similar materials, greatly reducing both weight and cost of the air spring.

Still another aspect of the invention is providing an air spring which may be formed by snap-fitting together the end components which seal the tubular sleeve without nuts, bolts, or other torque-applied connectors.

A further aspect of the invention is the sealing of the end members with the sleeve ends by forming a pair of spaced apart pinch areas in the ends of the sleeve by the configuration of the mating members which places the sleeve in compressive shear at the two pinch areas, in combination with an intervening expansion area which changes the direction of the reinforcing cords molded within the sleeve ends approximately 180° which distributes the pulling force caused by the internal air pressure within the sleeve across the two pinch areas to enable the mating end members to withstand greater internal fluid pressure than heretofore possible without the use of separate reinforcing bead rings.

Another aspect of the invention is the formation of an air spring wherein the molding of a separate bead reinforcement within the ends of the sleeve is completely eliminated with the bead reinforcement function being provided by the pair of compressive shear pinch areas and intervening expansion area affected by the mating end components.

A further aspect of the invention is the providing of an air spring wherein the tensile load on the reinforcing cord changes 180° at two compressive shear pinch areas wherein the tensile load is in downward direction at one pinch area and in an upward direction at the other pinch area, and in which a third pinch area may be provided to assist in distributing the pulling force caused by the internal pressure across three different pinch areas which, in combination with the change of direction of the internal cord, provides an extremely strong and satisfactory seal for the ends of the elastomeric sleeve without internal bead reinforcement or other external sleeve clamping means.

The foregoing and other aspects of the invention which will become apparent as the detailed description proceeds are achieved by an air spring, the general nature of which may be stated as including a pair of end members adapted to be mounted at spaced locations; a flexible sleeve formed of an elastomeric material containing reinforcing cords and having open ends sealingly engaged with the end members forming a pressurized fluid chamber therebetween; one of said end member having an end cap extending within one of the open ends of the sleeve and a clamp ring extending about said one sleeve end in clamped engagement with said end cap compressing the sleeve material therebetween; and an annular curved projection formed on a mating surface of one of said end cap and clamp ring extending into a concave recess formed in a mating surface of the other of said end cap and clamp ring placing the sleeve in compressive shear throughout two spaced annular areas on opposite sides of said projection, and an intervening area within said recess between said annular compressive shear areas having a greater separation than the thickness of the sleeve material to permit the sleeve material to expand therein.

BRIEF DESCRIPTION OF THE DRAWINGS

Preferred embodiments of the invention, illustrative of the best mode in which applicant has contemplated applying the principles, are set forth in the following description and are shown in the drawings and are particularly and distinctly pointed out and set forth in the appended claims.

FIG. 1 is a diagrammatic perspective view of the improved air spring of the invention;

FIG. 2 is an enlarged fragmentary vertical cross-sectional view of the improved air spring of FIG. 1;

FIG. 3 is a further enlarged fragmentary sectional view of the snap-fitted connection of the end cap and clamp ring of the upper end member of the air spring of FIGS. 1 and 2;

FIG. 4 is an exploded fragmentary view with portions in section showing a modified end member for sealing the ends of the sleeve of the improved air spring of the invention in disassembled position;

FIG. 5 is a fragmentary sectional view of the modified end member of FIG. 4 in assembled position; and FIG. 6 is a greatly enlarged fragmentary sectional view showing the various pinch areas and expansion areas provided by the modified end member of FIGS. 4 and 5.

Similar numerals refer to similar parts through the drawings.

BEST MODE FOR CARRYING OUT THE INVENTION

Referring now to the drawings and more particularly to FIGS. 1 and 2, the improved air spring of the invention is indicated generally at 10. The center portion of air spring 10 is formed by a cylindrically tubular-shaped sleeve 12 which is formed to an appropriate length from suitable elastomeric material 13 containing reinforcing fabric formed by biased cords 14, shown particularly in FIG. 3, without a separate reinforcing bead being molded into either end of the sleeve as in prior art sleeve constructions. An end cap assembly or end member indicated generally at 15, is secured to sleeve 12 at opposite ends thereof. Cap assemblies 15 are adapted to be secured to portions of a vehicle or other spaced structures between which relative movement is to be dampened. The uses of the air spring of the instant invention are no different from those previously known, the invention herein residing in the structure and more particularly the sealing of the sleeve ends to form a pressurized fluid chamber 18 therein by end cap 15.

Each end cap assembly 15 preferably is similar and therfore only one is shown and described in detail. End cap assembly 15 comprises a generally disc-shaped end cap 16 interconnected with an annular clamp ring 20. Ring 20 comprises an outer cylindrical side wall 22 which is normal and upstanding to an annular base 24 (FIG. 3).

In accordance with the main feature of the invention the inner end of annular base 24 terminates in an upwardly extending projection 26 which is spaced radially inwardly from sidewall 22 and which terminates in a rounded top end 28. An annular concave recess 29 is formed outwardly of projection 26 and is separated from sidewall 22 by an annular shoulder 30 also formed as a part of base 24. The inside surface of wall 22 is cylindrical and terminates in a snap-lip 31 having a beveled edge 32. The inner surface of ring 20 defined by projection 26, concave recess 29, shoulder 30, and cylindrical inner surface 33 of cylindrical wall 22 is collectively referred to as a mating surface and is indicated generally at 35.

End cap 16 is formed with an inner mating surface indicated generally at 37, formed with a main inner concave recess indicated generally at 38 which axially aligns with and receives a portion of projection 26 of clamp ring 20. Mating surface 37 further includes an annular relatively flat radially extending area 39 which terminates in an outwardly tapered inclined annular surface 40 which converges toward sidewall 22 of clamp ring 20. Surface 40 terminates in a snap-lip 42 having a beveled surface 43 which is clampingly engaged with beveled edge 32 of snap-lip 31.

One of the main features of the invention is the alignment of mating surfaces 35 and 37 to form a pair of pinch areas indicated at 45 and 46 (FIG. 3) located between the axially extending side surfaces 48 of projection 26 and the generally parallel axially extending side surfaces 50 which form concave recess 38. The radial distance between aligned surfaces 48 and 50, which are generally parallel to each other as shown in FIG. 3, is preferably approximately 50% of the uncompressed thickness of elastomeric material 13 of sleeve 12. Thus upon the axial engagement of end cap 16 with clamp ring 20, the elastomeric material in the pinch areas indicated at 52 and 53, is placed in shear compression securing the sleeve tightly therebetween.

In further accordance with the invention, rounded the top end 28 of projection 26, is spaced from bottom surface 55 of concave recess 38 a distance greater than the thickness of material 13 providing an expansion zone or area for movement of the compressed rubber in the pinch areas to expand or flow into the expansion area which is indicated at 56.

As shown in FIG. 3, reinforcing cord 14 moves through a direction change of approximately 180° when moving from pinch area 45 through expansion area 56 and then through pinch area 46. This change of direction places a downward tensile load on the cord as shown by arrow A in moving through pinch area 45 and placing an upward tensile load on the cord as indicated by arrow B, when moving through pinch area 46. The particular configuration of mating surfaces 35 and 37 has been found to provide the required clamping action and force on sleeve 12 to maintain it in a secured clamped position between end cap 16 and clamp ring 20.

The bottom of concave recess 29 of clamp ring 20 is spaced a sufficient distance, a distance greater than the thickness of material 13, from flat radial surface 39 of end cap 16 to provide a second expansion area 58. This is followed by a third pinch area 59 formed between annular shoulder 30 and radial flat surface 39 providing additional holding and clamping action on the sleeve end. An outer expansion area 60, having a generally triangular configuration, is formed between end cap tapered surface 40 and inner cylindrical surface 33 of clamp ring sidewall 22 to permit any remaining rubber caused by pinch area 59 which does not flow into expansion area 58 to have a void area in which to flow to permit the satisfactory snap joining of end cap 16 with clamp ring 20.

The particular configuration of mating surfaces 35 and 37 causes the elastomeric material of sleeve 12 to form around various contours, and when combined with the pinch areas and expansion areas, has been found to provide an extremely strong clamping action between the end cap and sealing ring enabling the internal pressure within chamber 18 to be increased to a pressure at least equal to that provided by end clamping members in which the sleeve has internally molded reinforcing clamping beads or bands.

Since the rubber or elastomeric material 13 is generally incompressible after reaching a certain amount of compression, expansion areas 56, 58 and 60 are provided to ensure a proper clamping action between cap 16 and ring 20 at spaced pinch areas 45, 46 and 59 for securely clamping the sleeve therein. The change of direction of fabric cord 14 as it moves through the spaced pinch areas and intervening expansion area and into the final expansion areas is believed to provide the resistance to the disengagement of the clamped sleeve material from between end cap 16 and ring 20. End cap 16 is formed with a plurality of threaded holes 54 for securing the end cap to a vehicle or the like with upper end cap 16 being provided with a threaded opening 62 for receiving the nipple of a pressure valve for connecting the air spring to a pressure source for pressurizing chamber 18.

With continued reference to FIGS. 1-3, it can be seen that end cap 16 may be easily positioned at the end of the sleeve 12. To do so, the bead ring 20 is first slid over the outer periphery of elastomeric sleeve 12 a predefined distance. With the inner diameter of the ring 20 being less than the outer diameter of the sleeve 12, the rubber of sleeve 12 is drawn inwardly within the ring. Next, the end cap 16 is brought within the end opening of sleeve 12 as it extends through ring 20, securing the elastomeric material of the sleeve between the outer peripheral contoured mating surface 37 of end cap 16 and the generally similarly shaped inner mating surface 35 of ring 20. The clamping forces developed between mating surfaces 35 and 37 as discussed above prevent sleeve 12 from slipping or moving while end cap 16 is engaged with ring 20.

It will be readily appreciated that, in operation, end cap assemblies 15 are secured to relatively movable members such as on a vehicle. It will also be understood that fluid pressure chamber 18 defined by the sleeve 12, is pressurized to provide the spring action. With movement of the end caps relatively restricted, the pressure force within chamber 18 exerts radial, rather than axial force on the mating seals defined by the spaced concentric projections and recesses of the mating surfaces maintaining compressed sleeve material therebetween. This force tends to increase the effectiveness of sealing or clamping action as the internal pressure increases.

A modified form of the improved air spring, and in particular, the end cap assembly therefor, is indicated generally at 64 and is shown in FIGS. 4, 5 and 6. The modified end cap assembly includes an end cap and clamping ring indicated generally at 65 and 66 respectively. End cap 65 is a solid disc-shaped member having an outer surface 67 formed with a helical projection 68 which forms a intervening helical-shaped recess 69. Helical projection 68 is formed with rounded outer surfaces 73 to prevent cutting into elastomeric material 13 as described below. As shown in FIG. 5 a plurality of threaded mounting holes 71 and a threaded pressure supply opening 72 are provided in end cap 65 for mounting the air spring to a supporting structure and to provide for the flow of pressurized fluid into fluid chamber 18 of the air spring in a usual manner well known in the art. Clamp ring 66 is annular-shaped having an inner mating surface indicated generally at 75, formed by an helical projection 76 forming an intervening helical-shaped concave recess 77.

Referring to FIGS. 4 and 5, the outer end of sleeve 12 is inserted through the interior of clamp ring 66 followed by the engagement of end cap 65 therein by a rotational motion similar to the threaded engagement of an externally threaded member into an internally threaded opening. In accordance with the principles of the invention, helical projection 68 of end cap 65 extends into helical concave recess 77 of clamp ring 66 as shown in FIG. 6 to provide a series of pinch areas or zones, each of which is indicated by numeral 79. These pinch areas are followed by intervening expansion areas 80 whereby at least a pair of compressive shear areas are applied on the elastomeric material of sleeve 12 separated by an expansion areas whereby the rubber squeezed from the shear compressive areas flow into the intervening expansion area. Furthermore, cord 14 moving through a change in direction of approximately 180° when moving from one pinch area into a second pinch area with the tension exerted on the cord also reversing from an innward to an outward direction with respect to the longitudinal dimension or axis of sleeve 12 in a similar manner as described above with respect to end cap 16 and clamp ring 20.

Again, the combination of two pinch areas between the end cap and clamp ring which forms the pair of pinch areas to place the intervening sleeve material in shear compression, together with the intervening expansion zone, has been found to provide a secure clamping engagement with the sleeve end to enable the air spring to withstand sufficient internal pressure for its desired application.

Accordingly, the improved beadless air spring is simplified, provides an effective, safe, inexpensive, and efficient device which achieves all the enumerated objectives, provides for eliminating difficulties encountered with prior devices, and solves problems and obtains new result in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved beadless air spring is constructed and used, the characteristics of the construction and the advantageous, new and useful results obtained; the new and useful structures, devices, elements, arrangements, parts and combinations are set forth in the appended claims.

What is claimed is:

1. An improved air spring including:
   (a) a pair of end members adapted to be mounted at spaced locations;
   (b) a flexible sleeve formed of an elastomeric material containing reinforcing cords and having open ends sealingly engaged with the end members forming a pressurized fluid chamber therebetween;
   (c) one of said end members having an end cap extending within one of the open ends of the sleeve and a clamp ring extending about said one sleeve end in clamped engagement with said end cap compressing the sleeve material therebetween; and
   (d) an annular curved axially extending projection formed on a mating surface of the clamp ring extending into a concave recess formed in a mating surface of the end cap placing the sleeve in compression shear throughout radially spaced annular areas on opposite sides of said projection, and an intervening area within said recess between said annular compressive shear areas having a greater separation than the thickness of the sleeve material to permit the sleeve material to expand therein.

2. The air spring defined in claim 1 in which the sleeve cords move through a change in direction of approximately 180° between the two compressive areas and intervening expansion area.

3. The air spring defined in claim 1 in which an annular concave recess is formed in the clamp ring radially outwardly from the projection providing a second expansion area to permit the sleeve material to expand therein.

4. The air spring defined in claim 3 in which additional axially aligned mating surfaces are formed on the clamp ring and end cap and are spaced axially apart a distance less than the thickness of the sleeve material to axially compress the sleeve material therebetween.

5. An improved air spring including:
(a) a pair of end members adapted to be mounted at spaced locations;
(b) a flexible sleeve formed of an elastomeric material containing reinforcing cords and having open ends sealingly engaged with the end members forming a pressurized fluid chamber therebetween;
(c) one of said end members having an end cap extending within one of the open ends of the sleeve and a clamp ring extending about said one sleeve end in clamped engagement with said end cap compressing the sleeve material therebetween, the clamp ring and end cap having mutually engaged annular snap lips axially clamping said ring and cap together in a sealed engagement with the intervening sleeve material; and
(d) an annular curved projection formed on a mating surface of one of said end cap and clamp ring extending into a concave recess formed in a mating surface of the other of said end cap and clamp ring placing the sleeve in compressive shear throughout the spaced annular areas on opposite sides of said projection, and an intervening area within said recess between said annular compressive shear areas having a greater separation than the thickness of the sleeve material to permit the sleeve material to expand therein.

6. The air spring defined in claim 5 in which the snap lips have undercut mutually engageable surfaces.

7. The air spring defined in claim 1 in which the end cap and clamp ring are formed of plastic.

8. An improved air spring including:
(a) a pair of end members adapted to be mounted at spaced locations;
(b) a flexible sleeve formed of an elastomeric material containing reinforcing cords and having open ends sealingly engaged with the end members to form a pressurized fluid chamber therebetween;
(c) one of said end members having an end cap extending within one of the open ends of the sleeve and a clamp ring extending about said one sleeve end in clamped engagement with said end cap compressing the sleeve material therebetween; and
(d) a generally axially extending annular curved projection formed on the clamp ring extending into an axially aligned annular concave recess having a radial width sufficiently greater than the radial width of said projection forming two annular radially spaced areas surrounding said projection, each of said areas having a radial width less than the thickness of the sleeve material to radially compress the sleeve material between said projection and the end cap; and an annular expansion area between an extended end of the projection and a bottom of the recess having a greater axial separation than the thickness of the sleeve material to permit the sleeve material to expand therein.

9. An improved air spring including:
(a) a pair of end members adapted to be mounted at spaced locations:
(b) a flexible sleeve formed of an elastomeric material containing reinforcing cords and having open ends sealingly engaged with the end members forming a pressurized fluid chamber therebetween;
(c) one of said end members having an end cap extending within one of the open ends of the sleeve and a clamp ring extending about said one sleeve end in clamped engagement with said end cap compressing the sleeve material therebetween; and
(d) an annular curved projection formed on a mating surface of one of said end cap and clamp ring extending into a concave recess formed in a mating surface of the other of said end cap and clamp ring placing the sleeve in compressive shear throughout radial spaced annular areas on opposite sides of said projection, and an intervening area within said recess between said annular compressive shear areas having a greater separation than the thickness of the sleeve material to permit the sleeve material to expand therein, said spaced areas formed between side surfaces of said projection and side surfaces of the concave recess having a radial spacing approximately 50% of the thickness of the sleeve material.

10. An improved air spring including:
(a) a pair of end members adapted to be mounted at spaced locations;
(b) a flexible sleeve formed of an elastomeric material containing reinforcing cords and having open ends sealingly engaged with the end members forming a pressurized fluid chamber therebetween;
(c) one of said end members having an end cap extending within one of the open ends of the sleeve and a clamp ring extending about said one sleeve end in clamped engagement with said end cap compressing the sleeve material therebetween;
(d) an annular curved projection formed on a mating surface of one of said end cap and clamp ring extending into a concave recess formed in a mating surface of the other of said end cap and clamp ring placing the sleeve in compressive shear throughout the spaced annular areas on opposite sides of said projection, and an intervening area within said recess between said annular compressive shear areas having a greater separation than the thickness of the sleeve material to permit the sleeve material to expand therein; and
(e) a third compression area formed between the end cap and clamp ring spaced radially outwardly from the two compressive shear areas.

11. An improved air spring including:
(a) a pair of end members adapted to be mounted at spaced locations;
(b) a flexible sleeve formed of an elastomeric material containing reinforcing cords and having open ends sealingly engaged with the end members forming a pressurized fluid chamber therebetween;

(c) one of said end members having a disc-shaped end cap extending within one of the open ends of the sleeve and a clamp ring extending about said one sleeve end in clamped engagement with said end cap compressing the sleeve material therebetween; and (d) the end cap having an outer mating surface formed with a helical projection extending about said mating surface and forming an intervening annular helical recess, the clamp ring having an inner mating surface formed with a helical projection extending about said mating surface and forming an intervening annular helical recess, said helical projections of said end cap and clamp ring extending into the helical recesses of said clamp ring and end cap, respectively, placing the intervening sleeve in compressive shear throughout spaced annular areas on opposite sides of the helical projections and providing intervening expansion areas within said recesses having a greater separation than the thickness of the sleeve material to permit the sleeve material to expand therein.

* * * * *